W. WOOLCOCK.
HEATING AND FEEDING AIR AND STEAM TO FURNACES.

No. 187,743. Patented Feb. 27, 1877.

WITNESSES:

INVENTOR:
Wm. Woolcock
BY
ATTORNEYS.

UNITED STATES PATENT OFFICE.

WILLIAM WOOLCOCK, OF NEWBURG, OHIO, ASSIGNOR OF TWO-THIRDS HIS RIGHT TO ALFRED ATKINSON AND JNO. WOOLCOCK, OF SAME PLACE.

IMPROVEMENT IN HEATING AND FEEDING AIR AND STEAM TO FURNACES.

Specification forming part of Letters Patent No. 187,743, dated February 27, 1877; application filed October 14, 1876.

*To all whom it may concern:*

Figure 1:
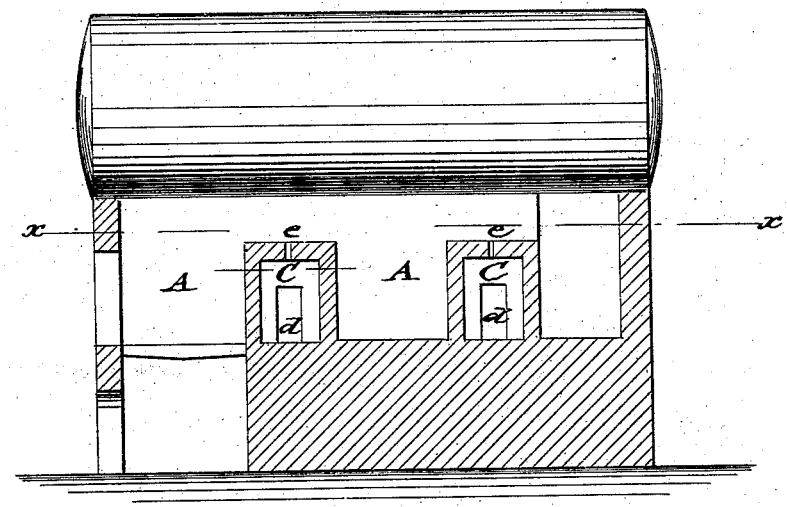
Figure 2:
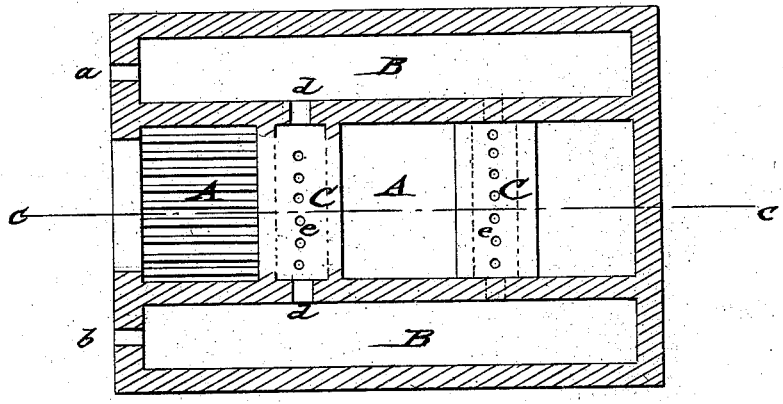

Be it known that I, WILLIAM WOOLCOCK, of Newburg, in the county of Cuyahoga and State of Ohio, have invented a new and Improved Furnace, of which the following is a specification:

In the accompanying drawing, Figure 1 represents a vertical longitudinal section on line $c\ c$, Fig. 2, of my improved furnace; and Fig. 2 is a horizontal section of the same on line $x\ x$, Fig. 1.

Similar letters of reference indicate corresponding parts.

The invention relates to an improved smoke-consuming furnace for heaters, steam-boilers, &c., by which a more complete combustion of the fire-gases is produced, and a more intense heat and corresponding saving of fuel obtained.

The invention consists in superheating the air and steam to such an extent as to decompose the steam, and thus changing its nature before it is fed to the fire, through a hollow bridge-wall, mingled with the air.

In the drawing, A represents a furnace for heaters, steam-boilers, and other purposes. The furnace A is built at both sides with chambers B, extending from the fire-box along the entire length of the furnace. One of the chambers B is supplied with air through an air-inlet port, $a$, the other chamber in similar manner with steam through a steam pipe and port, $b$.

The air and steam are first thoroughly heated up in their chambers preparatory to being mingled in the hollow fire-bridges C, with which the chambers B are connected by side openings $d$. The intense heat in the fire-box produces the decomposition of the heated steam and air, and throws the mingled gases through the issuing top holes $e$ into the fire-gases, so as to produce a more complete and quick combustion of the same.

If desired, more than one fire-bridge may be arranged in the furnace, so that all the gases of combustion are thoroughly mingled with the oxidizing-gases issuing from the fire-bridges, and thereby entirely consumed. A greater percentage of heat of a certain quantity of fuel is thereby obtained, and consequently a corresponding saving in fuel produced.

Having thus described my invention, I claim as new and desire to secure by Letters Patent—

In a smoke-consuming furnace, the combination of the chambers B, located on each side of the furnace, for the reception of air and steam, the inlets $a\ b$ to the chambers, outlets $d$, and hollow bridge C, provided with the holes $e$, whereby the steam is superheated, and the air heated before being mingled together and fed to the fire, substantially as shown and described.

WILLIAM WOOLCOCK.

Witnesses:
A. HUTCHISON,
A. ATKINSON.